US011055194B1

(12) United States Patent
Stylos et al.

(10) Patent No.: US 11,055,194 B1
(45) Date of Patent: Jul. 6, 2021

(54) ESTIMATING SERVICE COST OF EXECUTING CODE

(71) Applicant: International Business Machines Corporation, Armonk, NY (US)

(72) Inventors: Jeffrey Stylos, Somerville, MA (US); German Attanasio Ruiz, Somerville, MA (US); Ajiemar D. Santiago, Volente, TX (US); Dustin Popp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/733,361

(22) Filed: Jan. 3, 2020

(51) Int. Cl.
 *G06F 11/34* (2006.01)
 *G06F 9/54* (2006.01)
 *G06F 8/33* (2018.01)
 *G06F 11/36* (2006.01)
 *G06F 8/10* (2018.01)

(52) U.S. Cl.
 CPC ........... *G06F 11/3442* (2013.01); *G06F 8/10* (2013.01); *G06F 8/33* (2013.01); *G06F 9/54* (2013.01); *G06F 11/3664* (2013.01)

(58) Field of Classification Search
 CPC .......... G06F 11/3442; G06F 9/54; G06F 8/33; G06F 11/3664; G06F 8/10
 See application file for complete search history.

(56) References Cited

U.S. PATENT DOCUMENTS

| 6,510,422 | B1 | 1/2003 | Galindo-Legaria |
| 8,321,356 | B2 | 11/2012 | Awaida |
| 8,321,831 | B2 | 11/2012 | Faisst |
| 9,235,389 | B2 | 1/2016 | Kim |
| 9,438,556 | B1* | 9/2016 | Ganguly ............. G06F 9/45558 |
| 9,870,546 | B1 | 1/2018 | Reynolds |
| 2005/0066305 | A1 | 3/2005 | Lisanke |
| 2009/0234883 | A1* | 9/2009 | Hurst ................... G06F 16/2471 |
| 2010/0269094 | A1* | 10/2010 | Levenshteyn ............. G06F 8/20 |
| | | | 717/109 |
| 2014/0310249 | A1* | 10/2014 | Kowalski ................ G06F 16/21 |
| | | | 707/688 |
| 2019/0034246 | A1* | 1/2019 | Miller ................. G06F 9/45558 |

FOREIGN PATENT DOCUMENTS

CN 107748968 A 3/2018

OTHER PUBLICATIONS

Pressler et al., "Execution cost estimation for software deployment in component-based embedded systems," Proceedings of the 17th international ACM Sigsoft symposium on Component-based software engineering (CBSE '14). ACM, New York, NY, USA, Jun. 2014, pp. 123-128.
Herzig et al., "The art of testing less without sacrificing quality," Proceedings of the 37th International Conference on Software Engineering—vol. 1 (ICSE '15), vol. 1. IEEE Press, Piscataway, NJ, USA, May 2015, pp. 483-493.

\* cited by examiner

*Primary Examiner* — Arvin Eskandarnia
*Assistant Examiner* — Chhian (Amy) Ling
(74) *Attorney, Agent, or Firm* — VanLeeuwen & VanLeeuwen; Alexander G. Jochym

(57) ABSTRACT

An approach is provided in which the approach locates a web services call in a set of software code that is executable on a computer system. The approach determines a cost to call a web service from the set of software code and displays both the cost of the web services call and at least a portion of the set of software code comprising the web services call on a display.

17 Claims, 7 Drawing Sheets

ESTIMATING SERVICE COST OF EXECUTING CODE

BACKGROUND

Program analysis is the process of automatically analyzing the behavior of computer programs. Program analysis tools assist programmers in managing execution and memory cost of their computer programs. Static analysis, also referred to as static code analysis, is a method of computer program debugging that examines the software code without executing the computer program. Static analysis provides an understanding of the code structure and assists developers to ensure that the computer program adheres to industry standards.

Although today's program analysis tools are equipped to provide cost estimates for self-contained monolithic systems, software development trends are moving towards non-monolithic systems such as web services. Web services refer to a standardized approach of integrating Web-based applications using open standards (e.g., XML, SOAP, WSDL and UDDI) over an Internet Protocol (IP) backbone. Microservices architectures support a type of web services and include a suite of independently deployable, small, modular services referred to as "microservices." Each microservice executes a unique process and communicates through a well-defined, lightweight mechanism to serve a business goal using communication protocols. Microservices architectures have become a preferred way of developing software systems that operate in cloud-based environments.

BRIEF SUMMARY

According to one embodiment of the present disclosure, an approach is provided in which the approach locates a web services call in a set of software code that is executable on a computer system. The approach determines a cost to call a web service from the set of software code and displays both the cost of the web services call and at least a portion of the set of software code comprising the web services call on a display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
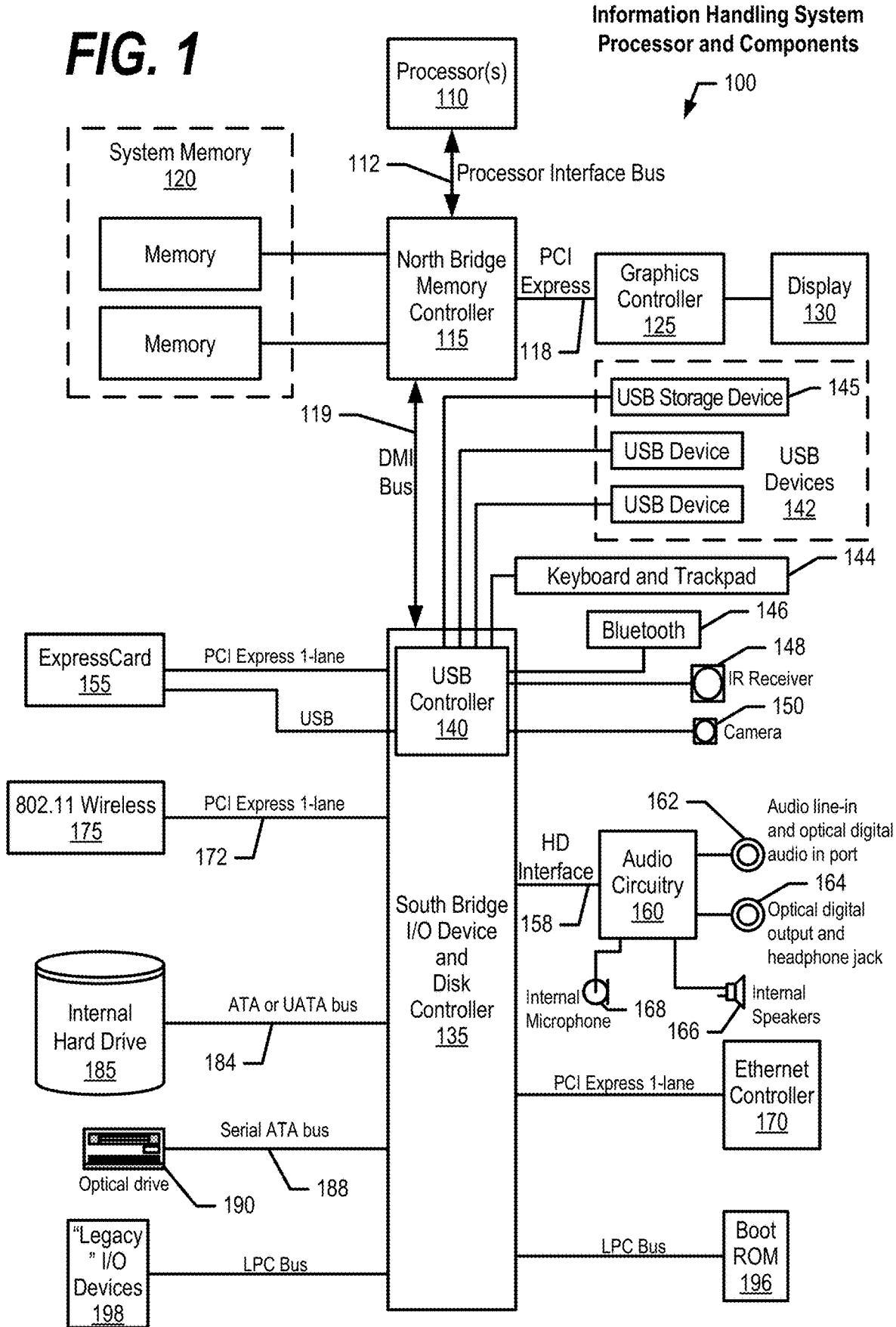
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
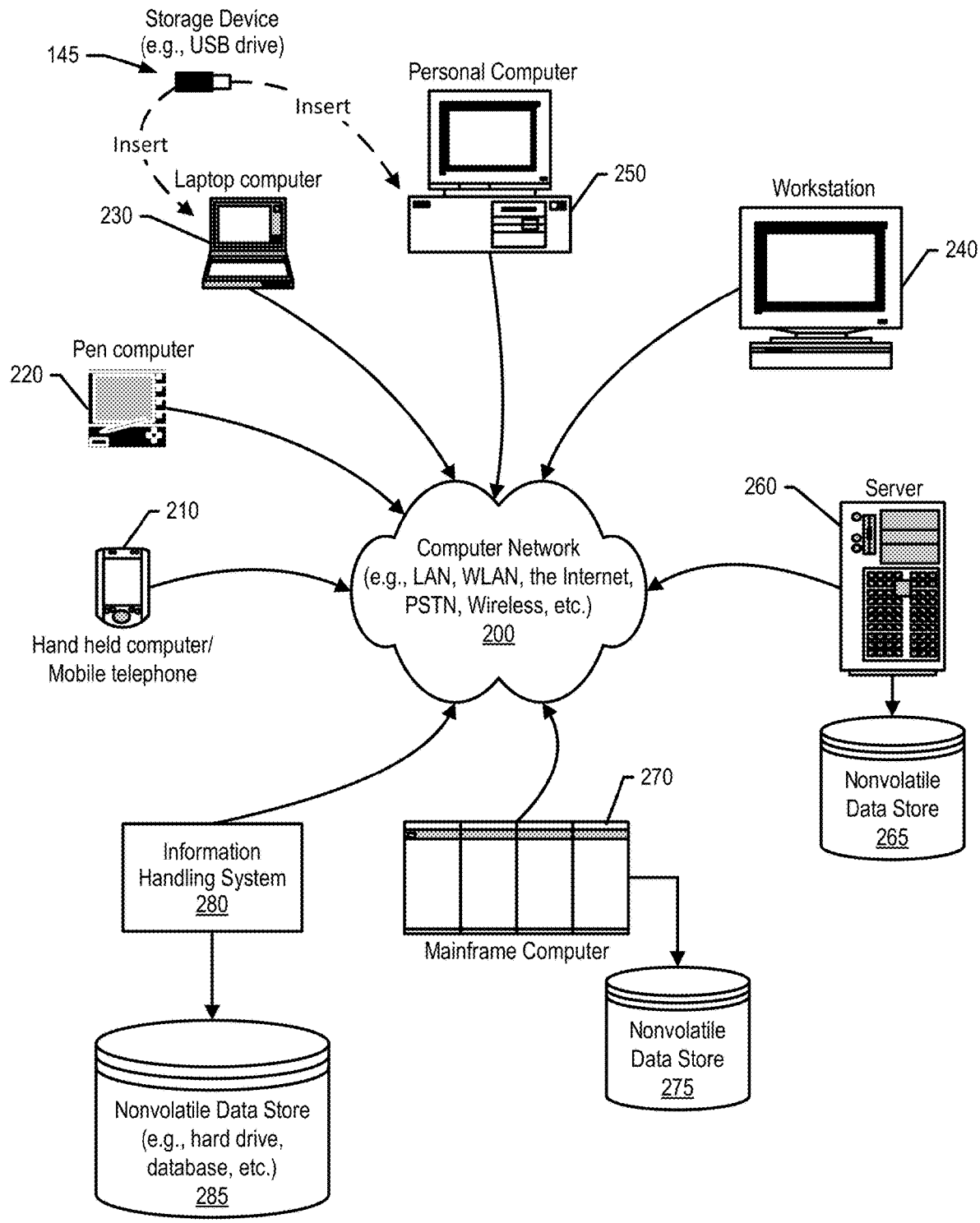
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, software development trends are moving towards non-monolithic approaches such as web services. With the rise of web services, however, developers are concerned with the monetary cost of utilizing (calling) the web services. Current development tools do not identify whether a computer program is financially expensive to run or if a change to the computer program will significantly change its incurred cost. As such, developers are hesitant about adopting web services because they have a difficult time estimating web services costs, which in turn impedes web services being implemented into software code.

FIGS. 3 through 7 depict an approach that can be executed on an information handling system that provides developers increased visibility and control of web services costs. The approach uses software development kit (SDK) annotations and static code analysis to estimate the monetary cost of web service calls in software code without executing the software code. The approach generates upper and lower bounds on the cost, as well as how the cost changes as a function of its input (e.g. size of the input file, number of total files in a directory, etc.). By providing developers confidence that the code under development will not accidentally result in a large bill, the developers are able to explore and utilize web services more freely. In one embodiment, the approach uses the annotations to track and limit the cost of executing computer programs during development stages and software code debug stages.

In one embodiment, the approach annotates REST (Representational state transfer) API specifications with per-call costs. In this embodiment, each method includes a fixed cost and/or variable costs based on one or more parameters (e.g., size of input). In this embodiment, multiple parameters have additive or multiplicative costs. Annotations can include the costs themselves or a URL to dynamically lookup the costs from the corresponding web service. When exact costs are not available, the approach uses static analysis to determine an approximate order of costs.

Figure 3:
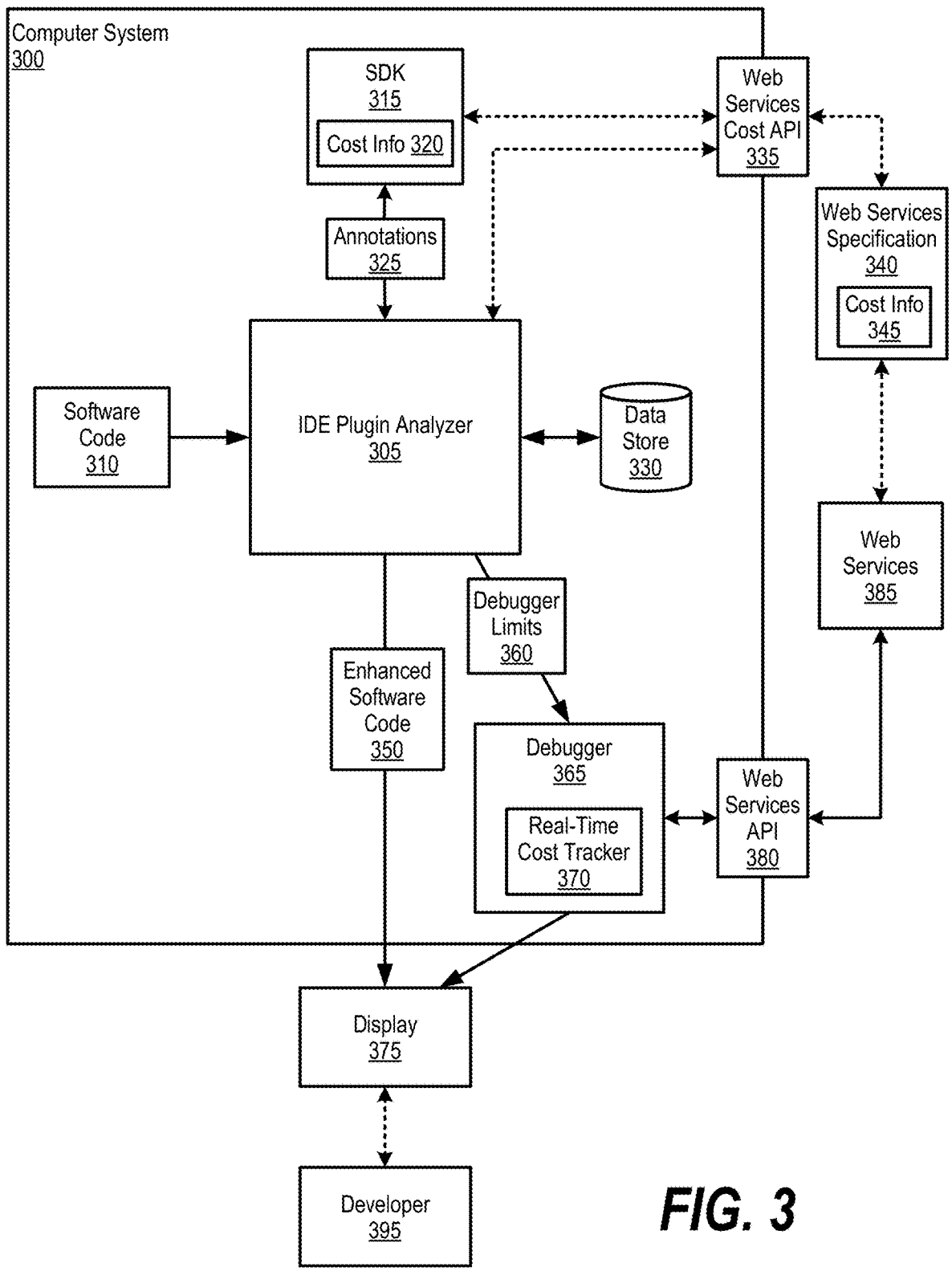
FIG. 3 is an exemplary high level diagram depicting a computer system capturing web services cost information and informing a developer of the web services cost information at locations in software code that call web services.

FIG. 3 is an exemplary high level diagram depicting a computer system capturing web services cost information and informing a developer of the web services cost information at locations in software code that call web services.

Computer system 300 includes IDE plugin analyzer 305, which receives software code 310 and generates an abstract syntax tree (AST) from software code 310. The AST is a tree representation of the abstract syntactic structures of code snippets. Each node of a tree denotes a construct occurring in the code snippet and the syntax is "abstract" in the sense that it represents the structural or content-related details of the code snippet. For example, grouping parentheses are implicit in the tree structure and a syntactic construct such as an "if-condition-then" expression may be denoted in the AST using a single node with three branches.

IDE plugin analyzer 305 analyzes the AST and identifies code paths that perform web services calls (e.g., to web services 385) and stores the information in data store 330. IDE plugin analyzer 305, in one embodiment, requests cost information corresponding to the identified web services calls from software development kit (SDK) 315 (see FIG. 4 and corresponding text for further details). In this embodiment, SDK 315 uses cost information 320 (generated from cost information 345 discussed in FIG. 4) to provide the web services call cost information via annotations 325 to IDE plugin analyzer 305. For example, IDE plugin analyzer 305 may detect a web services call "Visual Recognition v1" in software code 310 and send an input service name "Visual Recognition v1" to SDK 315. In turn, SDK 315 returns annotations 325 that includes operations and costs information such as {"costs": [{"operation": "createCollection", "cost": 0.60}, {"operation": "classify", "cost": 0.01, "scalesWith": ["images"]}]}. IDE plugin analyzer 305 stores the web services call cost information in data store 330.

In another embodiment, SDK 315 interfaces with web services specification 340 through web services cost API 335 to obtain cost information 345, which is similar to cost information 320. In this embodiment, SDK 315 may also receive real-time updates of cost information 345 through web services cost API 335. In yet another embodiment, IDE plugin analyzer 305 interfaces with web services specification 340 through web services cost API 335 to obtain cost information 345. In this embodiment, IDE plugin analyzer 305 may also receive real-time updates of cost information 345 through web services cost API 335 (see FIG. 4 and corresponding text for further details).

IDE plugin analyzer 305 performs static analysis on software code 310 and computes call estimates based on the cost information stored in data store 330 (#calls, input size, etc.). IDE plugin analyzer 305 then highlights the web services calls and adds cost information in proximity to the corresponding web services calls. IDE plugin analyzer 305 displays enhanced software code 350 on display 375, which includes the cost information and the highlighted API calls (see FIG. 5 and corresponding text for further details). In turn, developer 395 analyzes enhanced software code 350 and adjusts web services calls accordingly.

In one embodiment, IDE plugin analyzer 305 sends web services cost information (debugger limits 360) to debugger 365. Debugger 365 loads debugger limits 360 into real-time cost tracker 370 to track costs of web services calls through web services API 380 to web services 385 while debugging software code 310. In this embodiment, when the amount of real-time calls reaches a threshold, such as 80% of debugger limits 360, debugger 365 sends a message to display 375 to inform developer 395 of reaching the threshold. In one embodiment, debugger 365 terminates code execution when the real-time activity reaches the threshold so that unforeseen costs are not incurred from debugging software code 310.

Figure 4:
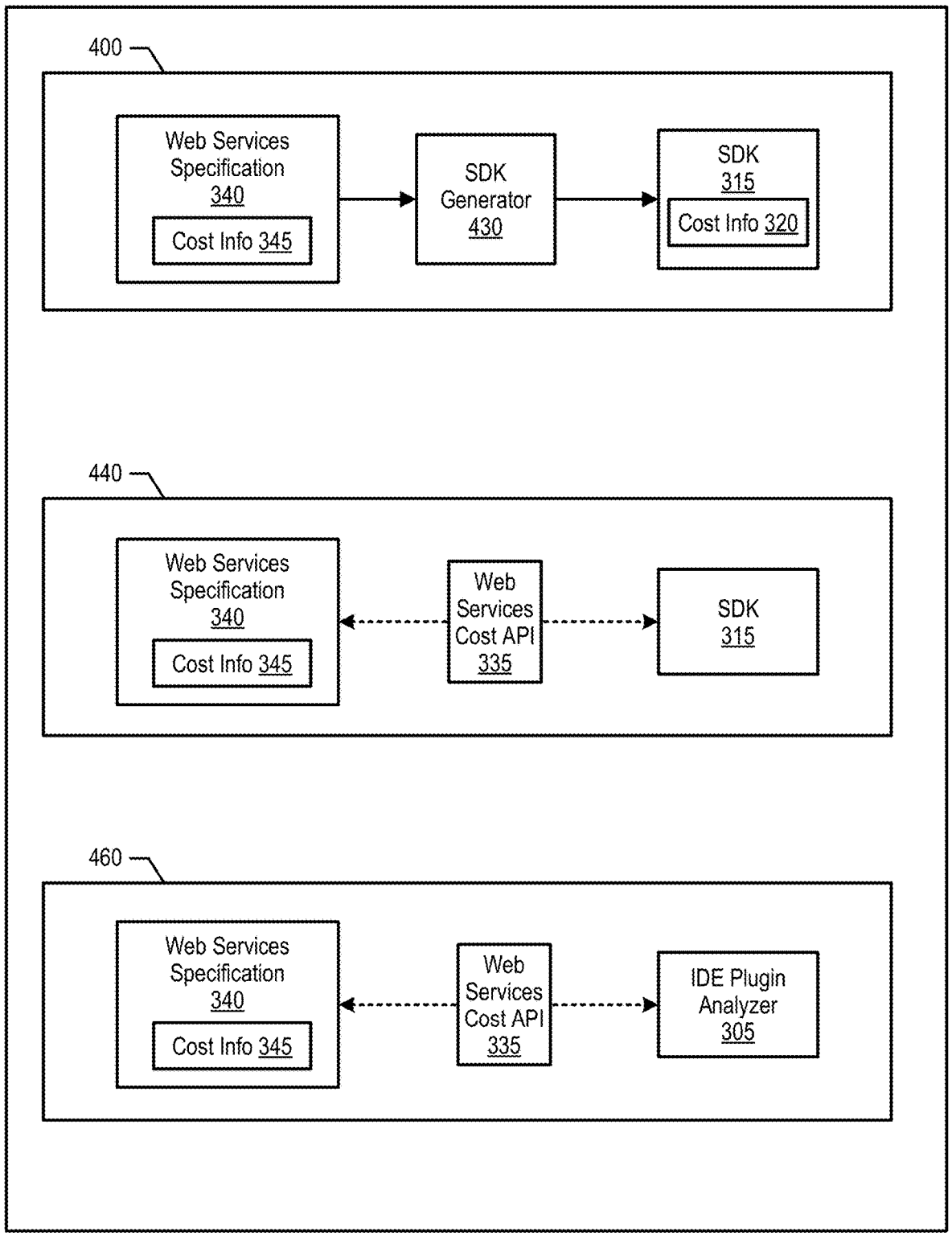
FIG. 4 is an exemplary diagram depicting various embodiments of capturing web services cost information.

FIG. 4 is an exemplary diagram depicting various embodiments of capturing web services call cost information to provide to IDE plugin analyzer 305. Configuration 400 shows SDK generator 430 accessing cost information 345 from web services specification 340 and creating SDK 315 and cost information 320. Cost information 320, in one embodiment, is a subset of cost information 345 based on the web services calls identified in software code 310. In one embodiment, SDK generator 430 is supported by a third party. In another embodiment, SDK generator 430 is within computer system 300's computer network.

Configuration 440 shows SDK 315 interfacing to web services specification 340 through web services cost API 335 to access cost information 345. In this embodiment, SDK 315 may also receive real-time updates of cost information 345 through web services cost API 335.

Configuration 460 shows IDE plugin analyzer 305 interfacing to web services specification 340 through web services cost API 335 to access cost information 345. In this embodiment, IDE plugin analyzer 305 may also receive real-time updates of cost information 345 through web services cost API 335.

Figure 5:
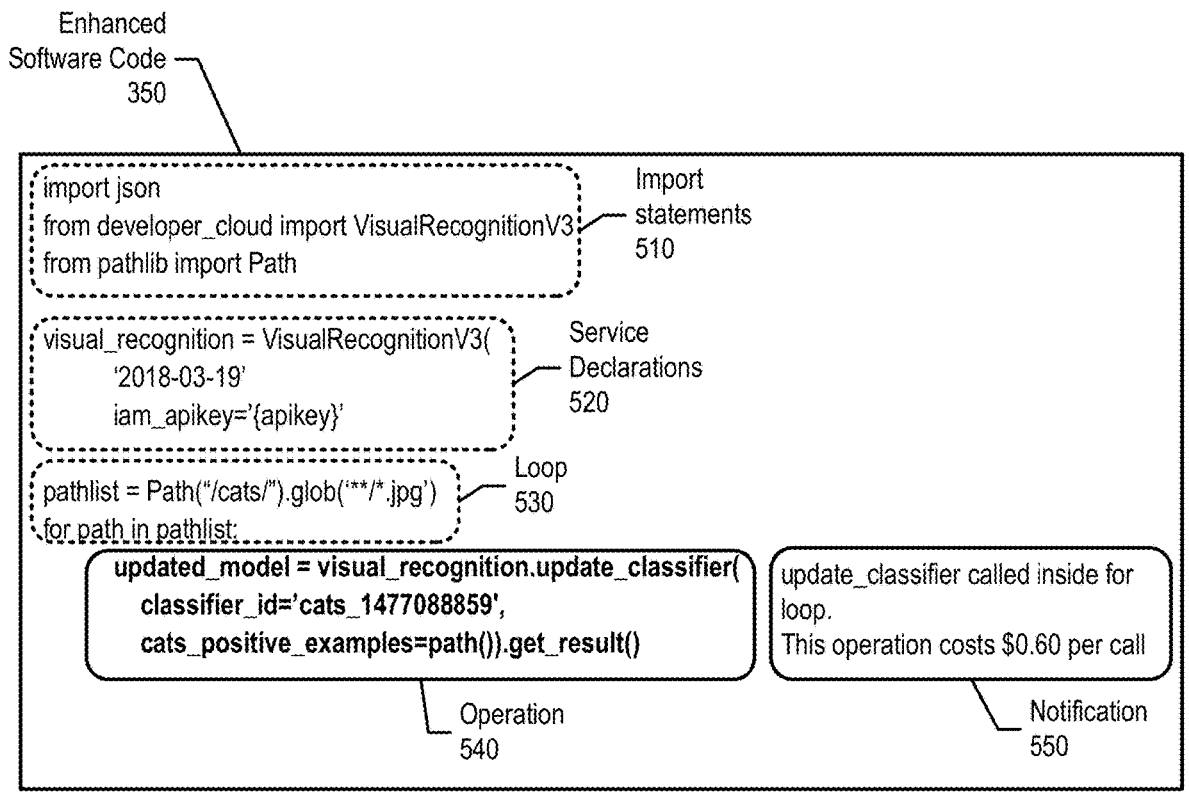
FIG. 5 is an exemplary diagram depicting software code with annotated web services cost information.

FIG. 5 is an exemplary diagram depicting enhanced software code that includes web services cost information. As discussed herein, IDE plugin analyzer 305 analyzes software code 310 that includes import statements 510, service declarations 520, loop 530, and operation 540. IDE plugin analyzer 305 detects that operation 540 calls web services "update_classifier" and performs steps as discussed herein to compute and display notification 550 in proximity to operation 540. Notification 550 informs developer 395 that each web services call to "update_classifier" is "$0.60." In turn, developer 395 may adjust software code 310 to call update_classifer more or less based on the cost information. In one embodiment, IDE plugin analyzer 305 highlights (bolds) operation 540 as shown to give emphasis to the web services call.

Figure 6:
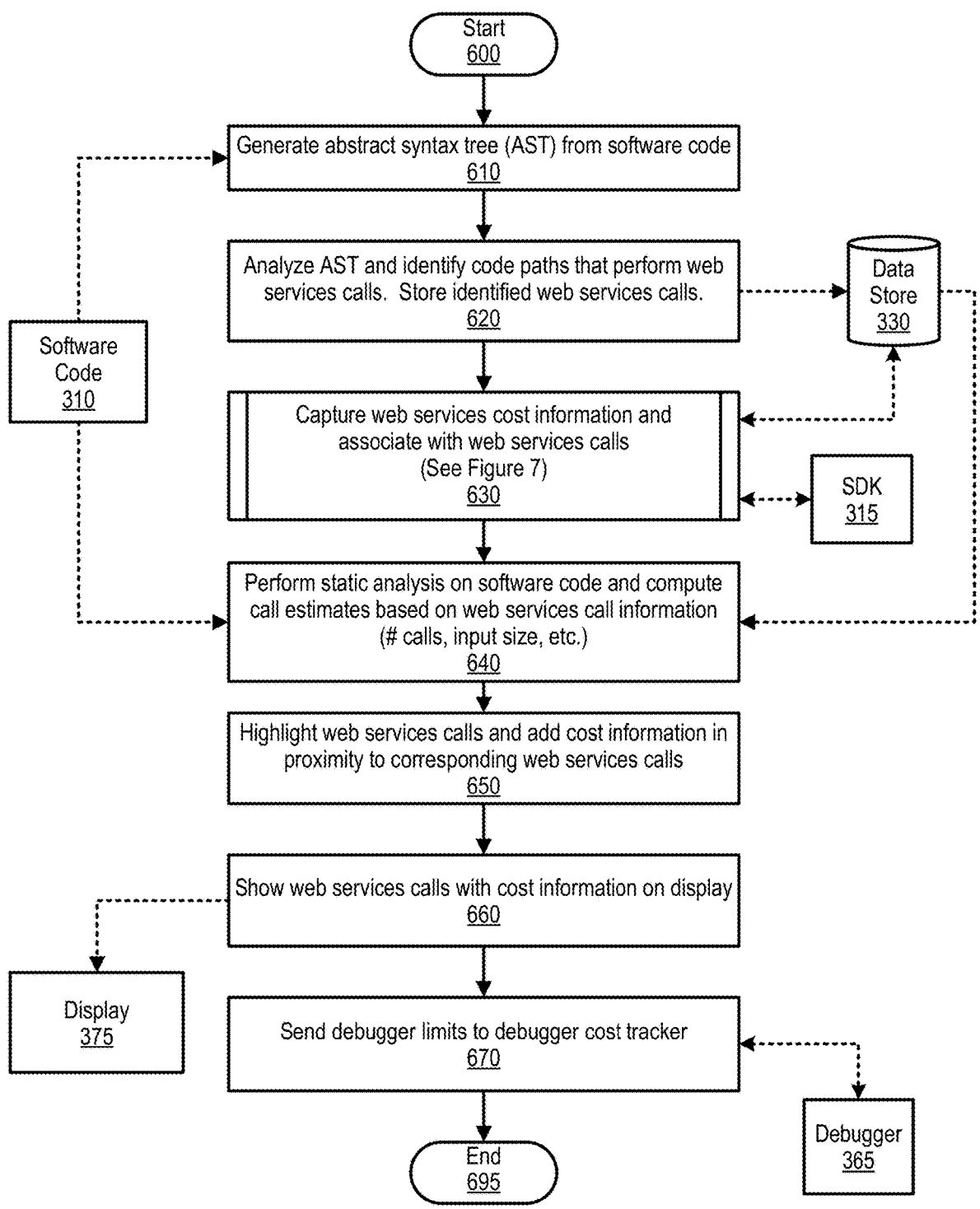
FIG. 6 is an exemplary flowchart showing steps taken to estimate service cost of performing web services calls.

FIG. 6 is an exemplary flowchart showing steps taken to estimate service cost of performing web services calls. FIG. 6 processing commences at 600 whereupon, at step 610, the process generates an abstract syntax tree (AST) from software code 310. At step 620, the process analyzes the AST and identifies code paths that perform web services calls. The process stores the identified web services calls in data store 330. At predefined process 630, the process captures web services cost information (e.g., from SDK 315's annotations 325) and associates the cost information with the corresponding web services calls (see FIG. 7 and corresponding text for processing details).

At step 640, the process performs static analysis on software code 310 and computes web services call estimates based on the web services call information stored in data store 330 (#calls, input size, etc.). At step 650, the process highlights the web services calls in the IDE and their corresponding web services call cost information (see FIG. 5, notification 550). In one embodiment, the process uses a cost threshold as a basis to identify and show potentially high costs web services calls based on per-call costs and/or the amount of calls to a given web services (e.g., calls greater than $0.50).

At step 660, the process shows the web services calls with cost information (enhanced software code 350) on display 375.

At step 670, in one embodiment, the process sends debugger limits 360 to debugger 365. Debugger limits 360 are based on the web services cost information, which debugger 365 uses to track real-time costs of web services calls performed by debugger 365 while debugging software code 310. In this embodiment, debugger 365 may terminate the debugging process when a cost limit is reached and notify developer 395 accordingly. FIG. 6 processing thereafter ends at 695.

Figure 7:
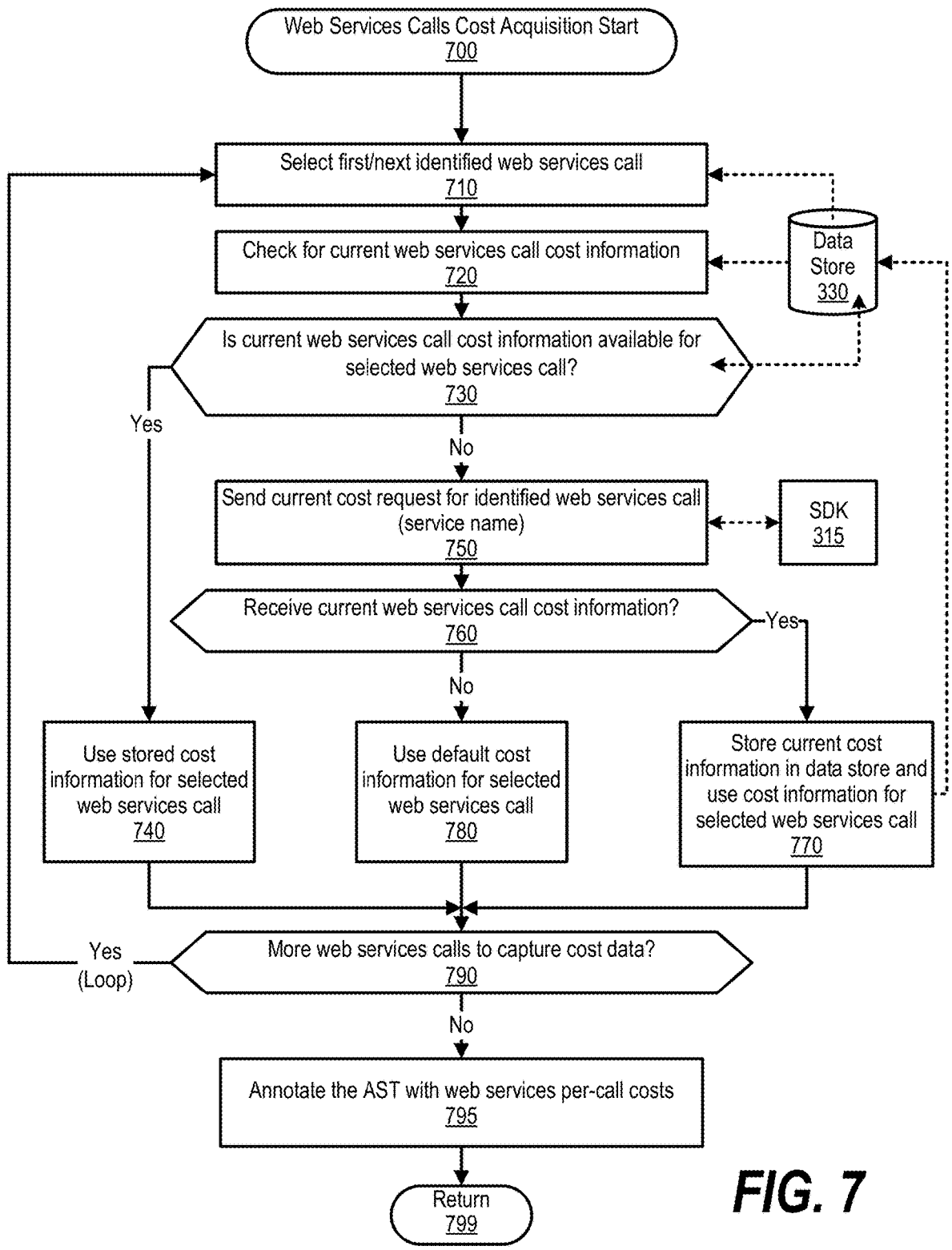
FIG. 7 is an exemplary flowchart showing steps taken to capture current web services cost information and associate the web services cost information to web services calls in software code.

FIG. 7 is an exemplary flowchart showing steps taken to capture current web services cost information and associate the web services cost call information to web services calls in software code. FIG. 7 processing commences at 700 whereupon, at step 710, the process selects the first identified web services call from data store 330. At step 720, in one embodiment, the process checks for current web services call cost information in data store 330 for the selected web services call. For example, the process checks whether data store 330 includes web services call cost information that is less than 60 days old for the selected web services call.

The process determines as to whether data store 330 includes current web services call cost information available for the selected web services call (decision 730). If data store 330 includes current web services call cost information, then decision 730 branches to the 'yes' branch whereupon, at step 740, the process uses the stored cost information for the selected web services call to generate corresponding annotations discussed herein.

On the other hand, if data store 330 does not include current web services call cost information for the selected web services call, then decision 730 branches to the 'no' branch. At step 750, the process sends a current cost request for the selected web services call (service name) to, in one embodiment, SDK 315. For example, the process generates a request that includes input service name "Visual Recognition v1" and receives corresponding operations and costs information such as {"costs": [{"operation": "createCollection", "cost": 0.60}, {"operation": "classify", "cost": 0.01, "scalesWith": ["images"]}]}. In another embodiment, the process sends a request to web services cost API 335 to communicate directly with web services specification 340 and receive the cost information.

The process determines as to whether current web services call cost information was received from the requested entity (decision 760). If the process received the current web services call cost information, then decision 760 branches to the 'yes' branch whereupon, at step 770, the process stores the current cost information in data store 330 and uses the currently received web services cost information for selected web services call annotations discussed herein.

On the other hand, if the process did not receive current web services call cost information, then decision 760 branches to the 'no' branch whereupon, at step 780, the process uses default cost information for the selected web services call annotations discussed herein. In one embodiment, the default cost information is an industry average of calling a web service.

The process determines as to whether there are more web services calls to select and capture cost data (decision 790). If there are more web services calls for which to select and capture cost data, then decision 790 branches to the 'yes' branch which loops back to select the next web services call and capture cost information. This looping continues until there are no more web services calls to select and capture cost information, at which point decision 790 branches to the 'no' branch exiting the loop. At step 795, the process annotates the AST with web services per-call costs. Each call is annotated with its monetary cost and the parameters with which the cost can change. In one embodiment, the process may not annotate the AST but instead store a list of web services call information and corresponding cost information for later analysis in FIG. 6. FIG. 7 processing thereafter returns to the calling routine (see FIG. 6) at 799.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   locating, by an integrated development environment (IDE) plugin executing on a computer system, a web services call in a set of software code that is executable on the computer system;
   determining a per call cost to call a web service from the set of software code, wherein the web service corresponds to the web services call;
   generating, by the IDE plugin, enhanced software code that comprises the set of software code and the per call cost to call the web service; and
   displaying the enhanced software code on a display.

2. The method of claim 1 wherein the per call cost to call the web service is an estimate cost and is determined prior to executing the set of software code.

3. The method of claim 1 further comprising:
   in response to locating the web services call, sending a request to a software development kit to obtain the per call cost to call the web service; and
   receiving an annotation comprising the per call cost to call the web service from the software development kit, wherein the software development kit received the per call cost to call the web service from a web serves specification through a web services cost application programming interface (API).

4. The method of claim 1 further comprising:
computing a debugger cost limit based on the per call cost to call the web service;
tracking, by a debugger, an actual cost of a currently executing debugging session of the set of software code; and
terminating, by the debugger, the currently executing debugging session in response to determining that the actual cost reaches the debugger cost limit.

5. The method of claim 1 further comprising:
in response to locating the web serves call, sending a request from the IDE plugin to a web services specification through a web services cost application programming interface (API); and
receiving the per call cost to call the web service from the web services specification through the web services cost API.

6. The method of claim 1 further comprising:
in response to determining that the per call cost to call the web service reaches a predefined threshold:
positioning the per call cost to call the web service in proximity to the web services call in the software code; and
highlighting the web services call on the display.

7. An information handling system comprising:
one or more processors;
a memory coupled to at least one of the processors;
a set of computer program instructions stored in the memory and executed by at least one of the processors in order to perform actions of:
locating, by an integrated development environment (IDE) plugin executing on a computer system, a web services call in a set of software code that is executable on the computer system;
determining a per call cost to call a web service from the set of software code, wherein the web service corresponds to the web services call;
generating, by the IDE plugin, enhanced software code that comprises the set of software code and the per call cost to call the web service; and
displaying the enhanced software code on a display.

8. The information handling system of claim 7 wherein the per call cost to call the web service is an estimate cost and is determined prior to executing the set of software code.

9. The information handling system of claim 7 wherein the processors perform additional actions comprising:
in response to locating the web services call, sending a request to a software development kit to obtain the per call cost to call the web service;
receiving an annotation comprising the per call cost to call the web service from the software development kit, wherein the software development kit received the per call cost to call the web service from a web services specification through a web services cost application programming interface (API).

10. The information handling system of claim 7 wherein the processors perform additional actions comprising:
computing a debugger cost limit based on the per call cost to call the web service;
tracking, by a debugger, an actual cost of a currently executing debugging session of the set of software code; and
terminating, by the debugger, the currently executing debugging session in response to determining that the actual cost reaches the debugger cost limit.

11. The information handling system of claim 7 wherein the processors perform additional actions comprising:
in response to locating the web services call, sending a request from the IDE plugin to a web service; specification through a web services cost application programming interface (API); and
receiving the per call cost to call the web service from the web services specification through the web services cost API.

12. The information handling system of claim 7 wherein the processors perform additional actions comprising:
in response to determining that the cost of the web services call reaches a predefined threshold:
positioning the cost of the web services call in proximity the web services call on the display; and
highlighting the web services call on the display.

13. A computer program product stored in a computer readable storage medium, comprising computer program code that, when executed by an information handling system, causes the information handling system to perform actions comprising:
locating, by an integrated development environment (IDE) plugin executing on a computer system, a web services call in a set of software code that is executable on the computer system;
determining a per call cost to call a web service from the set of software code, wherein the web service corresponds to the web services call;
generating, by the IDE plugin, enhanced software code that comprises the set of software code and the per call cost to call the web service; and
displaying the enhanced software code on a display.

14. The computer program product of claim 13 wherein the per call cost to call the web service is an estimate cost and is determined prior to executing the set of software code.

15. The computer program product of claim 13 wherein the information handling system performs further actions comprising:
in response to locating the web services call, sending a request to a software development kit to obtain the per call cost to call the web service; and
receiving an annotation comprising the per call cost to call the web service from the software development kit, wherein the software development kit received the per call cost to call the web service from a web services specification through a web services cost application programming interface (API).

16. The computer program product of claim 13 wherein the information handling system performs further actions comprising:
computing a debugger cost limit based on the per call cost to call the web service;
tracking, by a debugger, an actual cost of a currently executing debugging session of the set of software code; and
terminating, by the debugger, the currently executing debugging session in response to determining that the actual cost reaches the debugger cost limit.

17. The computer program product of claim 13 wherein the information handling system performs further actions comprising:
in response to locating the web services call, sending a request from the IDE plugin to a web services specification through a web services cost application programming interface (API); and
receiving the per call cost to call the web service from the web services specification through the web services cost API.

* * * * *